(12) United States Patent
Paul et al.

(10) Patent No.: US 11,513,893 B2
(45) Date of Patent: Nov. 29, 2022

(54) CONCURRENT COMPUTE AND ECC FOR IN-MEMORY MATRIX VECTOR OPERATIONS

(71) Applicant: Intel Corporation, Santa Clara, CA (US)

(72) Inventors: Somnath Paul, Hillsboro, OR (US); Charles Augustine, Portland, OR (US); Chen Koren, Hadera (IL); George Shchupak, Zviya (IL); Muhammad M. Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 17/128,414

(22) Filed: Dec. 21, 2020

(65) Prior Publication Data

US 2021/0109809 A1 Apr. 15, 2021

(51) Int. Cl.
*G06F 11/00* (2006.01)
*G06F 11/10* (2006.01)
*G06N 3/08* (2006.01)

(52) U.S. Cl.
CPC ........... *G06F 11/1068* (2013.01); *G06N 3/08* (2013.01)

(58) Field of Classification Search
CPC ............. G06F 11/1068; G06F 11/1016; G06F 11/1044; G06F 11/1076
See application file for complete search history.

(56) References Cited

U.S. PATENT DOCUMENTS

| | | | | |
|---|---|---|---|---|
| 6,044,398 A | * | 3/2000 | Marullo | G06F 16/958 703/22 |
| 6,735,726 B2 | * | 5/2004 | Muranaka | G06F 11/1008 365/201 |
| 7,120,836 B1 | | 10/2006 | Englin et al. | |
| 8,756,268 B2 | * | 6/2014 | Ahn | G06F 7/728 708/491 |
| 9,292,381 B2 | * | 3/2016 | Shalvi | G06F 11/1016 |
| 10,073,733 B1 | * | 9/2018 | Jain | G06F 11/108 |
| 10,332,594 B2 | * | 6/2019 | Miyashita | G11C 11/54 |
| 10,636,481 B1 | * | 4/2020 | Chang | G11C 11/419 |
| 10,964,356 B2 | * | 3/2021 | Wang | G11C 7/1087 |

(Continued)

OTHER PUBLICATIONS

Extended European Search Report for Patent Application No. 21198565.0, dated Mar. 17, 2022, 7 pages.

(Continued)

*Primary Examiner* — Esaw T Abraham
(74) *Attorney, Agent, or Firm* — Compass IP Law PC

(57) ABSTRACT

A system includes a compute circuit that preemptively performs a computation on a data word before receiving an indication of data errors from an error checking and correction (ECC) circuit. The ECC circuit reads the data word from a memory array and performs error detection and error correction on the data word. The compute circuit reads the data word and performs the computation on the data word to generate an output value, without waiting for the ECC circuit to check and correct the data word. In response to error detection in the data word by the ECC circuit, the compute circuit delays outputting the output value until correction of the output value in accordance with the error detection by the ECC circuit.

21 Claims, 7 Drawing Sheets

(56) References Cited

U.S. PATENT DOCUMENTS

| | | |
|---|---|---|
| 2003/0206629 A1* | 11/2003 | Eberle .................... G06F 7/724 380/30 |
| 2005/0204263 A1* | 9/2005 | Ricci .................. H03M 13/616 714/758 |
| 2008/0288848 A1 | 11/2008 | Bains |
| 2015/0242274 A1 | 8/2015 | Rozario et al. |
| 2018/0358989 A1* | 12/2018 | Mehra ............... H03M 13/2948 |
| 2019/0196901 A1 | 6/2019 | Arbel et al. |
| 2020/0026498 A1 | 1/2020 | Sumbul et al. |
| 2020/0371873 A1 | 11/2020 | Schaefer et al. |
| 2021/0005230 A1 | 1/2021 | Wang et al. |

OTHER PUBLICATIONS

Fowers, Jeremy, et. al., "A Configurable Cloud-Scale DNN Processor for Real-Time AI", Microsoft, 2018 ACM/IEEE 45th Annual International Symposium on Computer Architecture (ISCA), Jun. 1-6, 2018, 14 pages.

* cited by examiner

CONCURRENT COMPUTE AND ECC FOR IN-MEMORY MATRIX VECTOR OPERATIONS

FIELD

Descriptions are generally related to memory circuits, and more particular descriptions are related to compute-in-memory circuits with concurrent ECC decoding.

BACKGROUND

Computer artificial intelligence (AI) has been built on machine learning, particularly using deep learning techniques. With deep learning, a computing system organized as a neural network computes a statistical likelihood of a match of input data with prior computed data. A neural network refers to a plurality of interconnected processing nodes that enable the analysis of data to compare an input to "trained" data. Trained data refers to computational analysis of properties of known data to develop models to use to compare input data.

Certain deep learning applications, such as those that apply single- or small-batch MLPs (multi-layer-perceptrons), RNNs (recursive neural networks), and LSTMs (long short-term memory—a recursive neural network with feedback), typically perform matrix-vector (MxV) multiplications, where a vector (or a narrow matrix) with weight matrix. Other deep learning application, such as those that apply CNNs (convolution neural networks, such as used for image processing, video processing, or computations or classification of a two-dimensional (2D) image) or large-batch MLPs, are generally mapped to matrix-matrix (MxM) multiplications, where a matrix is multiplied with a weight matrix.

Dot-product operations for both MxV and MxM are performed by using an array of multiply-accumulate (MAC) arithmetic units. MAC operations typically require one of the inputs (e.g., the weight matrix) to be read from on-die memory and another input (e.g., the activation vector) to be broadcasted. Data stored in memory is protected by ECC (error checking and correction) for the detection and correction of errors associated with soft errors or process variations.

Traditionally, the system will read the data from memory and perform ECC detection and correction prior to the compute operation. Such an operation incurs at least a one-cycle latency overhead. When a compute operation is an order of magnitude greater than the cycles spent in the memory read, the additional cycle of ECC decoding delay is tolerable. However, iterative compute operations can involve compute operations that have compute cycle times comparable to the ECC decoding delay, which makes the ECC code significantly increase the compute operation time.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
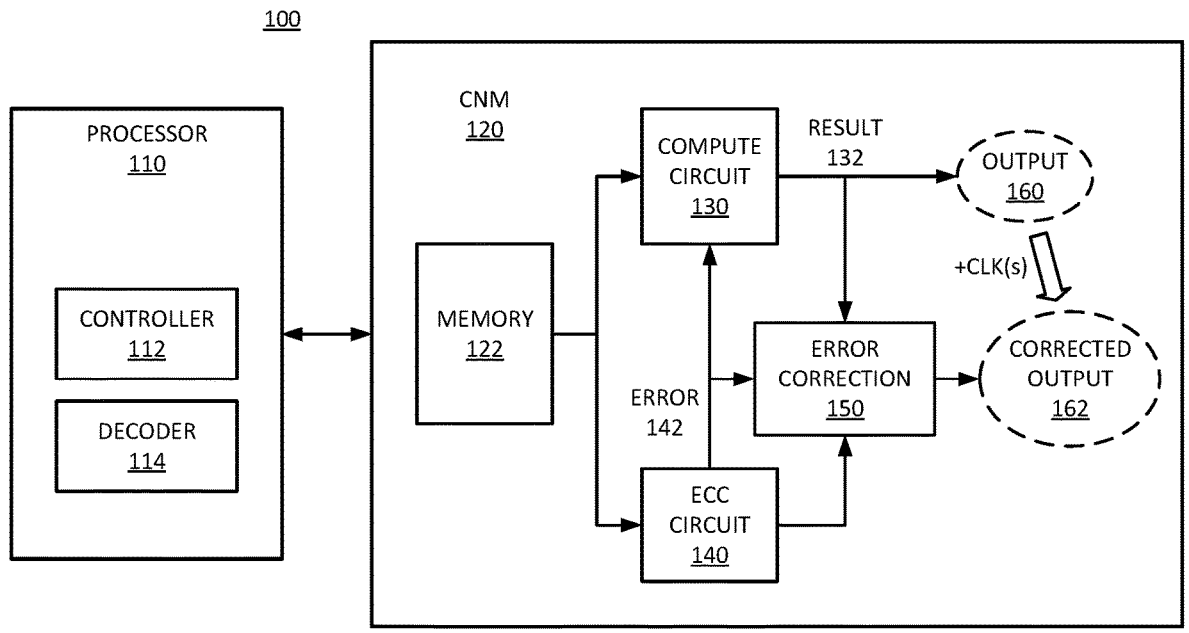
FIG. 1 is a block diagram of an example of a system that performs computation and error checking concurrently.

Descriptions of certain details and implementations follow, including non-limiting descriptions of the figures, which may depict some or all examples, and well as other potential implementations.

DETAILED DESCRIPTION

As described herein, a system includes a compute circuit that preemptively performs a computation on a data word before receiving an indication of data errors from an error checking and correction (ECC) circuit. The ECC circuit reads the data word from a memory array and performs error detection and error correction on the data word. The compute circuit reads the data word and performs the computation on the data word to generate an output value, without waiting for the ECC circuit to check and correct the data word. Thus, the ECC decoding of the memory value and the compute operation on the memory value can be simultaneous or in parallel.

It will be understood that for the great majority of memory accesses, there will be no error in the computation, and the computation can be used as soon as the ECC circuit determines there is no error in the source data. Seeing that errors can be very rare (e.g., 1 in 10,000), the system can perform concurrent ECC decoding and compute operation. In the rare case that the computation is performed on incorrect data due to not waiting for completion of the ECC decoding, the system can cause the compute circuit to delay output until computation could be performed on an incorrect data value. Thus, in response to error detection in the data word by the ECC circuit, the system can cause the compute circuit to delay outputting the output value until ECC correction is performed. In one example, the ECC correction can be performed on the output value in accordance with the error detection by the ECC circuit. Thus, the output can be the same as it would have been if the computation had been performed on the data after error correction.

Operations in which the compute hardware and the source memory are located on the same hardware or in very close proximity to avoid bus delays can be referred to as compute in memory (CIM) or compute near memory (CNM) (also referred to as near memory compute) systems. CNM will be used herein to describe a system in which the compute hardware and the memory are located in close proximity. The CNM system can apply concurrent ECC and compute operations, saving the latency associated with the ECC logic decoding, which can be a 1-cycle latency, or a multi-cycle latency, depending on the system architecture. Such close operation can benefit CNM systems, where a number of compute elements, such as MAC (multiply-accumulate) hardware, which can simply be referred to as MACs, are located close to the memory arrays to benefit from higher internal per-array memory bandwidth.

In one example, a MAC-based system distributes the ECC syndrome detection logic close to each memory array while the actual error correction hardware or correction logic is shared by multiple arrays. Separating the detection and correction allows the CNM to scale with lower overhead compared to a baseline architecture where the entire ECC logic is performed at each memory array. The ability to share the ECC correction hardware can come from the low likelihood that an error will be needed, which means that the likelihood of collision at the error correction logic is very low.

FIG. 1 is a block diagram of an example of a system that performs computation and error checking concurrently. System 100 includes processor 110, which represents a primary processor or host processor for a computing system or computing device having system 100. Processor 110 can be or include a CPU (central processing unit), graphics processing unit (GPU), or other processor in a computer system that generates a request for a compute near memory computation. Processor 110 generates operations to be executed by CNM 120, which represents a compute in/near memory circuit block. In one example, CNM 120 is or is part of a dedicated accelerator circuit or hardware accelerator or coprocessor, referring to a circuit connected to the processor for the offload of specific tasks.

CNM 120 can be a compute in memory circuit that includes a computation element in a memory subsystem to perform a computation. In one example, CNM 120 represents a compute in memory circuit where the memory is a near memory of a multilevel memory architecture, which includes at least one level of volatile memory with faster access than a far memory level of volatile or nonvolatile memory. In one example, CNM 120 is a compute in memory circuit where the memory is a cache or a dedicated compute memory. CNM 120 enables the operation of a computation in a memory circuit without having to send the data to processor 110.

In one example, CNM 120 performs computations such as dot-products, absolute difference of vectors, multiplications, square roots, or other computations. CNM 120 can provide neural network (NN) computations or deep learning processes for processor 110, with reduced transfer of data between memory and the processing units. The reduction in data movement can accelerate algorithms that are memory bandwidth limited and perform iterative operations with significantly improved speed and lower energy usage.

In one example, CNM 120 is hard coded in a CPU accelerator for processor 110, such as a multicore CPU. In one example, CNM 120 is implementation in a flexible or programmable processor hardware. In one example, CNM 120 is implemented in an FPGA (field programmable gate array) or other programmable circuit. CNM 120 includes compute circuit 130, which represents hardware within CNM to perform computations. In one example, compute circuit 130 is hard-coded logic. In one example, compute circuit 130 is programmable logic.

Processor 110 includes controller 112, which represents a memory controller or other controller that will generate a memory access request for memory 122 of CNM 120. Generation of the access request can include a request for a compute operation on the memory location(s) request from the memory device. In one example, processor 110 includes decoder 114. Decoder 114 represents hardware logic or software logic or a combination of hardware and software logic within processor 110 to decode a memory access request from processor 110 as a request for a computation that can be computed by CNM 120. In one example, decoder 114 determines from one or more memory access requests and other computations identified in an instruction pipeline of processor 110 that in memory computation by CNM 120 can be performed. In one example, decoder 114 is part of controller 112. Controller 112 can schedule the memory access operations corresponding to the execution of operations by processor 110.

CNM 120 includes memory 122, which represents a memory resource to enable in memory computations. Memory 122 represents an array of one or more memory locations to store various data values for use in computations by CNM 120. In one example, controller 112 loads data into memory 122 from one or more other memory locations in system 100 that are not shown, such as main system memory or a cache device. In one example, memory 122 includes an SRAM (static random access memory) device. In one example, memory 122 includes a DRAM (dynamic random access memory) device. In one example, memory 122 includes a 3DXP (three dimensional crosspoint) memory device. Memory 122 can store a data word for compute circuit 130 to operate on. The data word can be read from memory 122 as an input to compute circuit 130. The data word can be a codeword for the operation of ECC circuit 140, and thus, ECC circuit 140 can perform error detection on the data word.

CNM 120 includes ECC circuit 140 to perform error checking and correction of data read from memory 122 for the computation of operations by compute circuit 130. Date stored in memory 122 can be subject to errors due to process variations (e.g., hardware characteristics of memory 122 that can result in transient errors), environmental conditions (e.g., temperature or voltage variations that can result in transient errors), or other transient conditions that result in soft errors. Soft errors refer to errors that appear randomly in data, which are typically correctable by rewriting the memory media. ECC circuit 140 can be referred to as on-die ECC, referring specifically to logic or hardware at the memory device level, separate from whatever system-level ECC that will be performed by controller 112.

In CNM 120, when memory 122 is read, the data is provided to compute circuit 130 and to ECC circuit 140 in parallel. In a traditional on-memory ECC circuit, the ECC computations are performed prior to the data being returned as a result or provided for use, for example, by a compute circuit. In CNM 120, ECC circuit 140 performs ECC checking or ECC decoding at the same time as compute circuit 130 performs computations on the data. Error 142 represents a signal to indicate whether an ECC error was detected in the data read from memory 122.

In one example, if ECC circuit 140 detects no error in the data from memory 122, it simply allows compute circuit 130 to provide its computation result 132 as output 160. Output 160 represents an output or result of CNM 120 when there is no error in the source data from memory 122. In one example, output 160 is a partial result for an iterative computation. Thus, output 160 can be returned back to memory 122 for a subsequent computation iteration. In one example, output 160 is provided to another CNM circuit (not shown) or other circuit to generate a final CNM result to return to processor 110.

In one example, if error 142 indicates an error in the read data, result 132, the computation result by compute circuit 130, is not immediately provided as output 160. The parallel or concurrent operation of compute circuit 130 and ECC circuit 140 means that compute circuit 130 will generate a compute result before ECC circuit 140 can indicate whether the input data for the computation has an error. Thus, in one example, CNM 120 can correct result 132 of ECC circuit 140 based on error detection or error decoding by ECC circuit 140.

Error correction 150 represents a correction of result 132 to generate corrected output 162. Based on knowing where an error is in the data read from memory 122, CNM 120 can correct result 132 before providing the result as output 162. In one example, output 162 is a partial result for an iterative computation. Thus, output 162 can be returned back to memory 122 for a subsequent computation iteration. In one example, output 162 is provided to another CNM circuit (not shown) or other circuit to generate a final CNM result to return to processor 110.

Traditional ECC circuitry includes error correction to flip bits detected to be in error through the computation of syndrome values. Error correction 150 represents error correction logic that can flip bits in result 132 based on the decoding of the error syndrome. The correction circuitry traditionally flips bits corresponding to H-matrix entries that indicate the location of the error. It will be understood that result 132 will not necessarily have bit errors in the same locations as the data read from memory 122. Error correction 150 can flip bits of result 132 that will correspond to error that would be in error given the location of an error detected in the data read from memory 122. The location of the error(s) in result 132 can be known based on knowing the operation performed by compute circuit 130.

In one example, error correction 150 can represent an alternate data path or alternate output path for CNM 120. With an alternate path in CNM 120, the circuit would not need to perform the computation again on the corrected data. Thus, error correction 150 can represent error correction circuitry on a separate data path to generate corrected output 162. In one example, ECC circuit 140 can perform error checking and correction, and provide the corrected data to compute circuit 130. Then compute circuit 130 can again perform the computation and generate corrected output 162 based on performing the computation again. Such an implementation would include the error correction leading into compute circuit 130, rather than as a separate output path.

As is represented in system 100, the change from output 160 to corrected output 162 will result in one or more additional clock cycles. Thus, output 160 and corrected output 162 are illustrated with dashed lines as alternative output sources for the output of CNM 120. The arrow from output 160 to corrected output 162 represents the additional time it will take to generate an output for CNM 120 in the event that an error is detected by ECC circuit 140. Thus, corrected output 162 will only be used, and the additional clock cycles incurred, when an error is detected in the data from memory 122. Otherwise, output 160 will be provided as the output for CNM 120.

In one example, error 142 can operate as an output enable signal. Thus, if the ECC decoding results in a zero syndrome, error 142 can trigger compute circuit 130 to output its computation result. In case the result indicates an error, error 142 can prevent compute circuit 130 from outputting its computation result. The system can then perform a correction on the computation result and then output corrected output 162. However the logic is set up in CNM 120, the detection of an error can trigger compute circuit 130 to delay its output or can trigger the delay of the output of compute circuit 130 until the result is corrected.

System 100 can concurrently execute a compute operation (e.g., multiplication, square root) and ECC to save ECC latency. The decision to perform the operations in parallel is based on a probabilistic reality that transient errors correctable by in memory ECC are very uncommon. Thus, system 100 speculatively executes the compute operations without ECC, saving one or more cycles of ECC latency for the common case of no error. In the rare event of a memory error, ECC circuit 140 can detect the error in the same cycle as the speculative compute, CNM 120 can take one or more additional cycles to correct the final result. Error correction 150 can be simple correction logic common for ECC correction, or can be simple logic based on knowing the error location and the type of computation performed by compute circuit 130.

Figure 2:
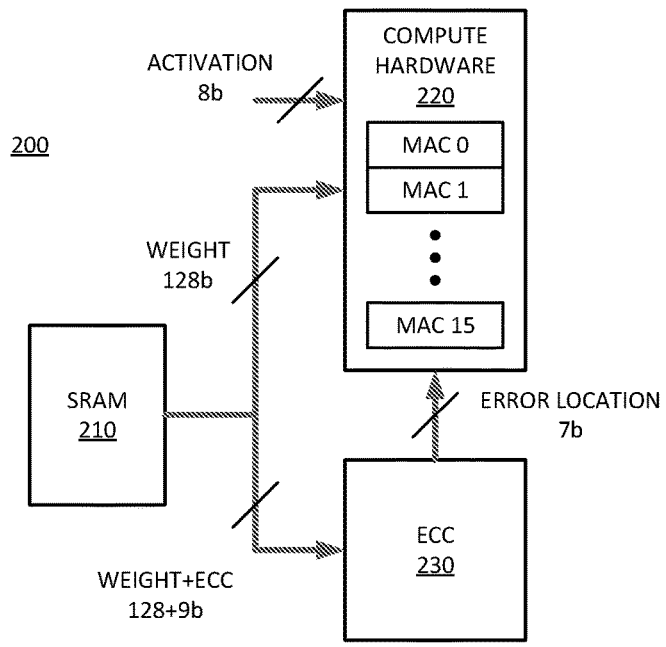
FIG. 2 is a block diagram of an example of a compute near memory circuit that performs computation without waiting for an error detection decision.

FIG. 2 is a block diagram of an example of a compute near memory circuit that performs computation without waiting for an error detection decision. Circuit 200 represents a compute near memory or compute in memory circuit in accordance with an example of CNM 120 of system 100. In one example, circuit 200 represents a compute element of a hardware accelerator. Circuit 200 can be one of multiple parallel compute circuits to perform operations in a computing device.

Circuit 200 includes SRAM 210, which represents a memory array to store a data word or computation weight that is the source data for a computation. Compute hardware 220 represents an example of computation hardware with MACs or MAC hardware. Circuit 200 illustrates 16 MAC units, which can vary for different system configurations. While MAC hardware is specifically illustrated, it will be understood that any other compute block could be used in compute hardware 220.

Circuit 200 specifically illustrates a system configuration for a matrix-vector operation for a machine learning (ML) inference application where an 8b shared activation is broadcasted and weights are fetched from a weight SRAM. SRAM 210 stores the weights or input values for computation. The 128b weight from SRAM 210 and the 8b activation signal are illustrated as inputs to compute hardware 220. Assuming a total of 128b are read from SRAM 210 per cycle, each one of the 16 MACs operates on 8b of a unique weight and 8b of shared activation.

Weights read from SRAM 210 are also provided as an input to ECC 230. In one example, ECC 230 includes both error detection logic and error correction logic. In one example, before a given MAC operation in this case. Assuming the 128b of weight are protected by SECDED (DECTED) ECC, one bit (two bits) can be corrected per 128b weight data. Hence for this 16 MAC operations example, up to 1 (2) MAC operations will be incorrect if we do not correct the weight data before MAC operations, while the remaining 15 (14) MAC operations will be correct.

Since errors from memory (e.g., SRAM 210) are expected to be very rare events, circuit 200 concurrently executes ECC with ECC 230 and MAC operations with compute hardware 220. In case of error detection, ECC 230 can flag the error(s) at the end of the compute cycle. After the compute cycle where circuit 200 would normally provide an output in the no-error case circuit 200 can correct one or more MAC operations in case of SECDED (single error correction, dual error detection) or in the case of DECTED (dual error correction, triple error detection). ECC 230 can point out which MAC(s) out of 16 MAC operations is (are) wrong with corrected bit(s) location(s). The 7b of error location can identify where an error is within the input data word.

In one example, in the case of one error detected by SECDED, using the bit-error location information, circuit 200 can correct the original computed MAC (MAC-orig) output to the corrected MAC (MAC-corr) output using the following logic: 1) for bit-corrected from 1 to 0: MAC-corr=MAC-orig−(Activation)×(2^bit-error-location); and, 2) for bit-corrected from 0 to 1: MAC-corr=MAC-orig+(Activation)×(2^bit-error-location). Other error correction mechanisms are possible. Different error correction can be used with different computation blocks in compute hardware 220.

In one example, instead of SRAM, the memory for circuit 200 can include dynamic random access memory (DRAM) cells or a DRAM array to store the data word. In one example, instead of SRAM, the memory for circuit 200 can include resistive-based random access memory (RAM) cells or a RAM array of resistive based cells to store the data word. Resistive-based memory cells can include 3DXP, resistive RAM (RRAM), or other memory devices.

The descriptions of circuit 200 can be for computations other than matrix-vector MAC computations. The descriptions of circuit 200 can apply to ECC protection other than SECDED/DECTED protection. The number of operations, the types of operations that need to be corrected, and the number of clock cycles involved can vary beyond what is described, implementing the same principles described.

Figure 3A:
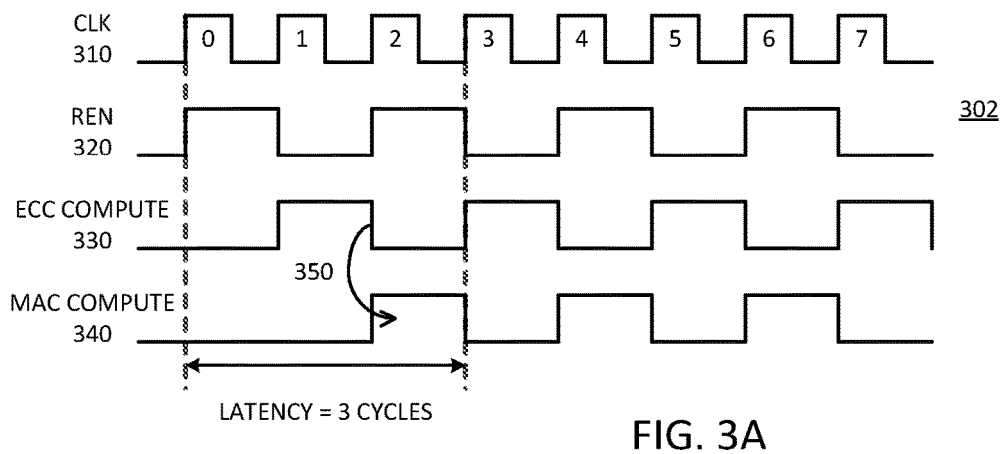
FIG. 3A is a timing diagram of an example of sequential ECC and compute operations.

FIG. 3A is a timing diagram of an example of sequential ECC and compute operations. Diagram 302 represents a baseline compute pipeline for a matrix-vector operation with ECC circuitry that takes one clock cycle to decode the ECC, and MAC compute hardware to compute a MAC operation in one clock cycle. It will be understood that other system configurations can be used, and the example provided is not limiting.

Diagram 302 includes clock signal (CLK) 310 to represent the clock cycles for the CNM circuit. Read enable signal (REN) 320 represents a signal that controls reading a data word for computation from the source memory array. In one example, a memory controller that control access to the CNM circuitry generates CLK 310 and REN 320.

Diagram 302 can represent a compute pipeline of MAC operations, with one operand read from memory using REN 320 every other clock. After reading the operand from memory, ECC compute 330 represents the computation of the ECC detection and correction logic. MAC compute 340 represents the computation of the MAC operation the clock cycle after the computation of ECC.

Point 350 represents the time from the end of ECC compute 330 to the computation of the MAC operation by MAC compute 340. It can be observed that the total latency of the operation is 3 cycles, from the read enable to the output of the MAC calculation result. It will be understood that the example of diagram 302 is for ECC compute logic that performs error detection and correction in one operation cycle or unit interval (UI) or one clock cycle. In one example, the ECC compute will take more than one clock cycle. It will be understood that the example of diagram 302 is for MAC compute logic that performs a computation in one operation cycle or unit interval (UI) or one clock cycle. In one example, the compute logic will take more than one clock cycle.

Figure 3B:
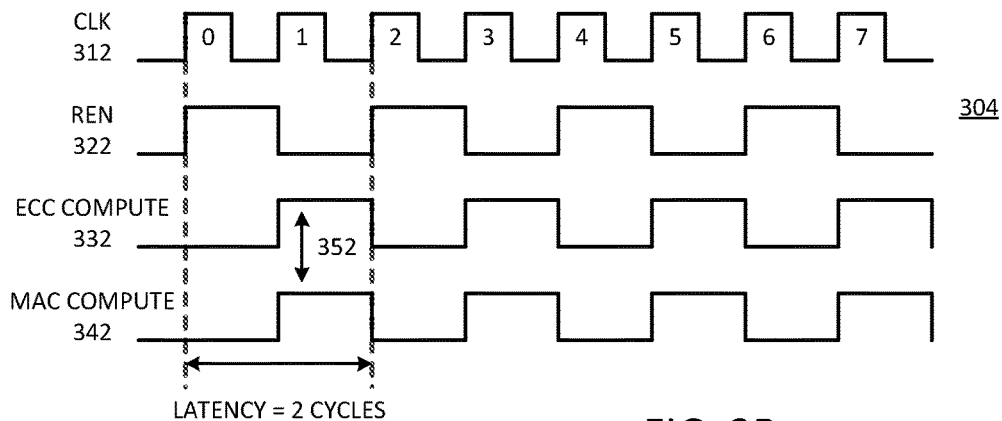
FIG. 3B is a timing diagram of an example of ECC and compute operations in parallel.

FIG. 3B is a timing diagram of an example of ECC and compute operations in parallel. Diagram 304 represents a compute pipeline for a matrix-vector operation with ECC circuitry that takes one clock cycle to decode the ECC, and MAC compute hardware to compute a MAC operation in one clock cycle. It will be understood that other system configurations can be used, and the example provided is not limiting.

Diagram 304 includes clock signal (CLK) 312 to represent the clock cycles for the CNM circuit. Read enable signal (REN) 322 represents a signal that controls reading a data word for computation from the source memory array. In one example, a memory controller that control access to the CNM circuitry generates CLK 312 and REN 322.

Diagram 304 can represent a compute pipeline of MAC operations with concurrent ECC and MAC operations, with one operand read from memory using REN 322 every other clock. In contrast to the example of diagram 302, ECC compute 332 and MAC compute 342 occur at the same time, one clock cycle after REN 322 enables the read of the memory.

Point 352 represents the fact that the MAC operation by MAC compute 342 occurs at the same time as ECC compute 332, without waiting for an ECC computation result. It can be observed that the total latency of the operation is 2 cycles, from the read enable to the output of the MAC calculation result. With the single clock cycle operations, it will be observed that the latency of operation can be reduced from 3 cycles to 2 cycles, resulting in a savings of 33%.

In addition to latency saving, parallel computation of the compute operation and the ECC decoding enables savings in the number of flip-flops required at the pipeline boundaries. For example, in a baseline design, the system needs 128 flops+ECC bits (8 in the case of SECDED) after the memory, which is then provided as an input to the ECC logic. The ECC output, which in the example would be another 128 bits, would then need another 128 flops, which is then provided as an input to the MAC units. Thus, a traditional system may require 256 flops in addition to flops for the ECC bits. With parallel compute and ECC operations, the system can use 128 flops+ECC bits (8 in the case of SECDED) after the memory. Since the ECC and MAC units simultaneously access the data from memory, the 128 flops+ECC bits is the total number of flops needed. In one example, with the parallel operations described, there will be flops used for error detection (e.g., 9b) and error correction (e.g., 7b). Even accounting for the additional flops, the total number of flops for this example would be 128+ECC bits+9+7=144+ECC bits flops, as compared to the baseline example of 256+ECC bits flops.

Figure 3C:
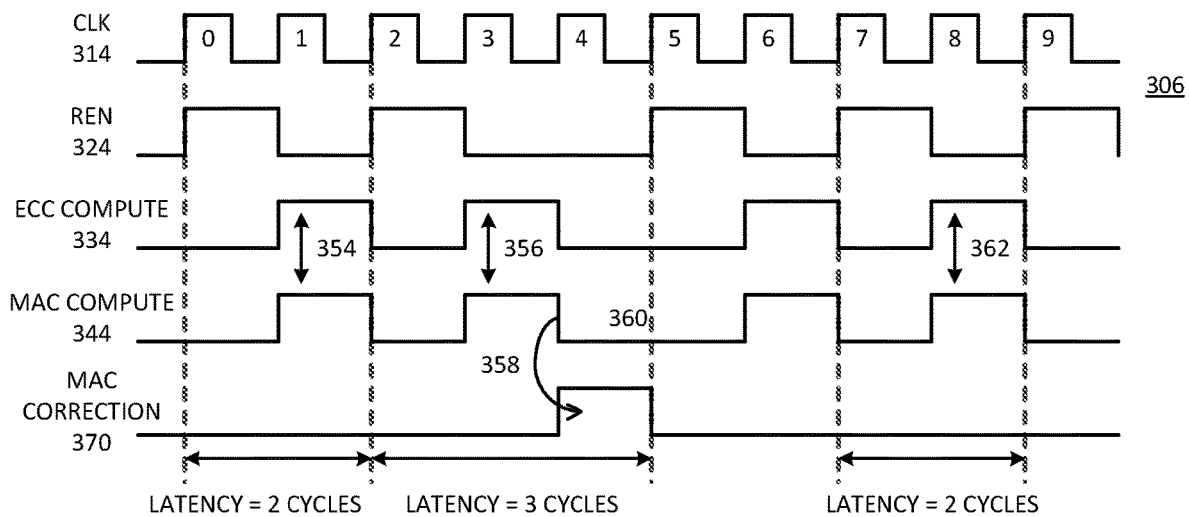
FIG. 3C is a timing diagram of an example of ECC and compute operations where error detection extends compute timing.

FIG. 3C is a timing diagram of an example of ECC and compute operations where error detection extends compute timing. Diagram 304 illustrates the case where no errors are detected in the read data word. Most of the time, there will be no errors, and computation for the MAC operations can occur as in diagram 304.

Diagram 306 illustrates the case in which there is one or more correctable errors in the data from the memory. Diagram 306 can represent the case of SECDED for 1 error, or the case of DECTED for 2 errors, where the bit correction can be based on knowing where the error or errors existed in the source data word. In one example, the system can optionally delay the read enable signal (REN), depending on the architecture and workload. In one example, depending on the pipeline architecture, read enable can be delayed when an error is detected, to delay processing the next input until the error is corrected. In one example, when the pipeline is fully utilized, the read enable can be delay when an error is detected to delay processing the next input until the error is corrected.

Diagram 306 represents a compute pipeline for a matrix-vector operation with ECC circuitry that takes one clock cycle to decode the ECC, and MAC compute hardware to compute a MAC operation in one clock cycle. Error correction also takes one clock cycle. It will be understood that other system configurations can be used, and the example provided is not limiting.

Diagram 306 includes clock signal (CLK) 314 to represent the clock cycles for the CNM circuit. Read enable signal (REN) 324 represents a signal that controls reading a data word for computation from the source memory array. In one example, a memory controller that control access to the CNM circuitry generates CLK 314 and REN 324.

Diagram 306 can represent a compute pipeline of MAC operations with concurrent ECC and MAC operations, with one operand read from memory using REN 324 every other clock, unless an error is detected. In case an error is detected, REN 326 can be disabled for a clock cycle to allow correcting a computation error prior to reading a new data word. In one example, if the pipeline architecture allows for the computation to continue and the workload of the pipeline allows for the computation to continue, REN is not disabled even when an error is detected. Rather, REN can be asserted again in clock 4, where the pipeline will hide the additional cycle of delay to correct the error. As with the example of diagram 304, ECC compute 334 and MAC compute 344 occur at the same time, one clock cycle after REN 324 enables the read of the memory.

Point 354 represents the fact that the MAC operation by MAC compute 344 occurs at the same time as ECC compute 334, without waiting for an ECC computation result. It can be observed that the total latency of the operation is 2 cycles, from the read enable to the output of the MAC calculation result.

Point 356 represents detection of an error by the ECC logic. Thus, instead of simply providing the output and continuing to the next computation, at point 358 MAC correction 370 is enabled, which adds another clock cycle to the CNM operation. Point 360 illustrates that the output is ready after the MAC correction operation, without another REN 324 being issued during the MAC correction.

It can be observed that the first MAC operation with no errors occurs from clocks 0:1, while the second MAC operation with an error occurs from clocks 2:4. In one example, the next two MAC operations occur from clocks 5:6 and clocks 7:8, as illustrated. The MAC operations can occur at 4:5 and 6:7 if REN is not disabled for a clock cycle in response to detection of an error. The MAC operation at clocks 7:8 is labeled similar to the MAC operation from clocks 0:1. Point 362 illustrates that the MAC operation and the ECC operation occur at the same time, with the output occurring after completion of the compute operation for the no-error case.

Figure 4:
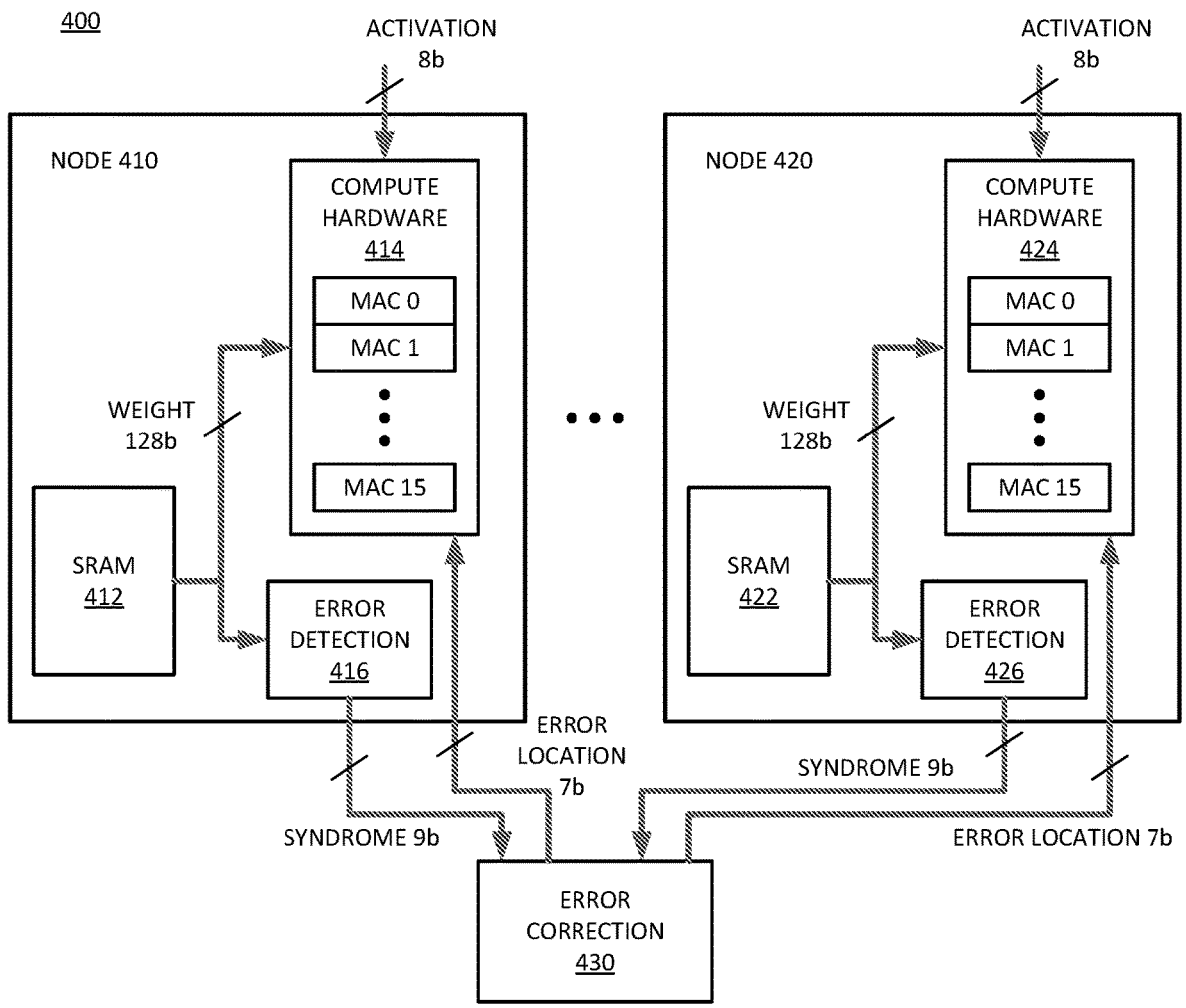
FIG. 4 is a block diagram of an example of a compute near memory circuit that performs computation without waiting for an error detection decision, with shared error correction.

FIG. 4 is a block diagram of an example of a compute near memory circuit that performs computation without waiting for an error detection decision, with shared error correction.

System 400 illustrates a system in accordance with an example of system 100. System 400 includes compute nodes in accordance with an example of circuit 200.

Whereas in circuit 200, each compute node includes ECC with error detection and error correction, system 400 distributes error correction hardware among multiple compute nodes. Thus, system 400 can represent a speculative concurrent ECC-compute circuit for the case when the compute is distributed close to the memory arrays as in CNM architectures.

System 400 includes two compute nodes, node 410 and node 420. The compute nodes can alternatively be referred to as arrays, referring to the array of memory and the array of compute circuits. The compute nodes can alternatively be referred to as compute pipelines, referring to the multi-cycle operation to read and compute the output.

Compute node 410 includes SRAM 412, which represents a memory array to a data word. Compute hardware 414 represents an example of computation hardware with MACs. Node 410 includes error detection 416. Likewise, node 420 includes SRAM 422, which represents a memory array to a data word. Compute hardware 424 represents an example of computation hardware with MACs. Node 420 includes error detection 426.

Instead of having both error detection (e.g., syndrome calculation) and error correction logic with each node, node 410 and node 420 share error correction 430. It will be understood that more than two nodes or arrays. As mentioned above, the fact that errors are very rare, the use of error correction 430 will be a rare event. Given that any memory error is a rare event, concurrent errors can be even more rare, allowing multiple compute nodes to share error correction hardware.

In one example, node 410 and node 420 output a 128b weight from their respective memory arrays to compute hardware 414 and error detection 416, and to compute hardware 424 and error detection 426, respectively. In one example, the 8b activation signal is distributed to node 410 and to node 420. Thus, the respective 128b weights and the common 8b activation signal are illustrated as inputs to compute hardware 414 and compute hardware 424. Assuming a total of 128b are read from SRAM 412 and SRAM 422, respectively, per cycle, each one of the 16 MACs operates on 8b of a unique weight and 8b of shared activation. In one example, the activation signal is different for different nodes, depending on the system configuration.

In one example, error detection 416 checks the syndrome for errors for the weight from SRAM 412 for node 410, and error detection 426 checks the syndrome for errors for the weight from SRAM 422 for node 420. Typically, when the syndrome is non-zero, it indicates an error at a particular bit location, which triggers error correction 430. In one example, error correction 430 is shared among the compute nodes and sends back the location of the error bit to the appropriate node that triggered the error correction. In one example, the indication of the error location is subsequently used to correct the compute hardware output (e.g., a partial product for a matrix-vector product). The sharing of error correction 430 among two arrays can save on significant chip area, as compared to having both ECC detection and detection with each array or compute node.

Sharing the ECC correction hardware could be performed across more compute nodes, resulting in more area savings, depending on the likelihood of error collision. Error collision refers to a case when both compute nodes report an error in the same clock cycle to error correction 430. In addition to the likelihood of concurrent errors, the system design can depend on the ability to tolerate or address such a collision. Thus, in one example, system 400 can share error correction 430 among 2 compute nodes, 3 compute nodes, 4 compute nodes, 5 compute nodes, or some other number of nodes.

In one example, the sharing of error correction 430 across more nodes can enable the implementation of more robust error correction logic. Error logic that would take too much die area to implement for every compute node individually can be implemented in shared error correction hardware in system 400. Thus, sharing the error correction can result in improved error correction while still saving die area.

The descriptions of system 400 can be for computations other than matrix-vector MAC computations. The descriptions of system 400 can apply to ECC protection other than SECDED/DECTED protection. The number of operations, the types of operations that need to be corrected, and the number of clock cycles involved can vary beyond what is described, implementing the same principles described.

Figure 5:
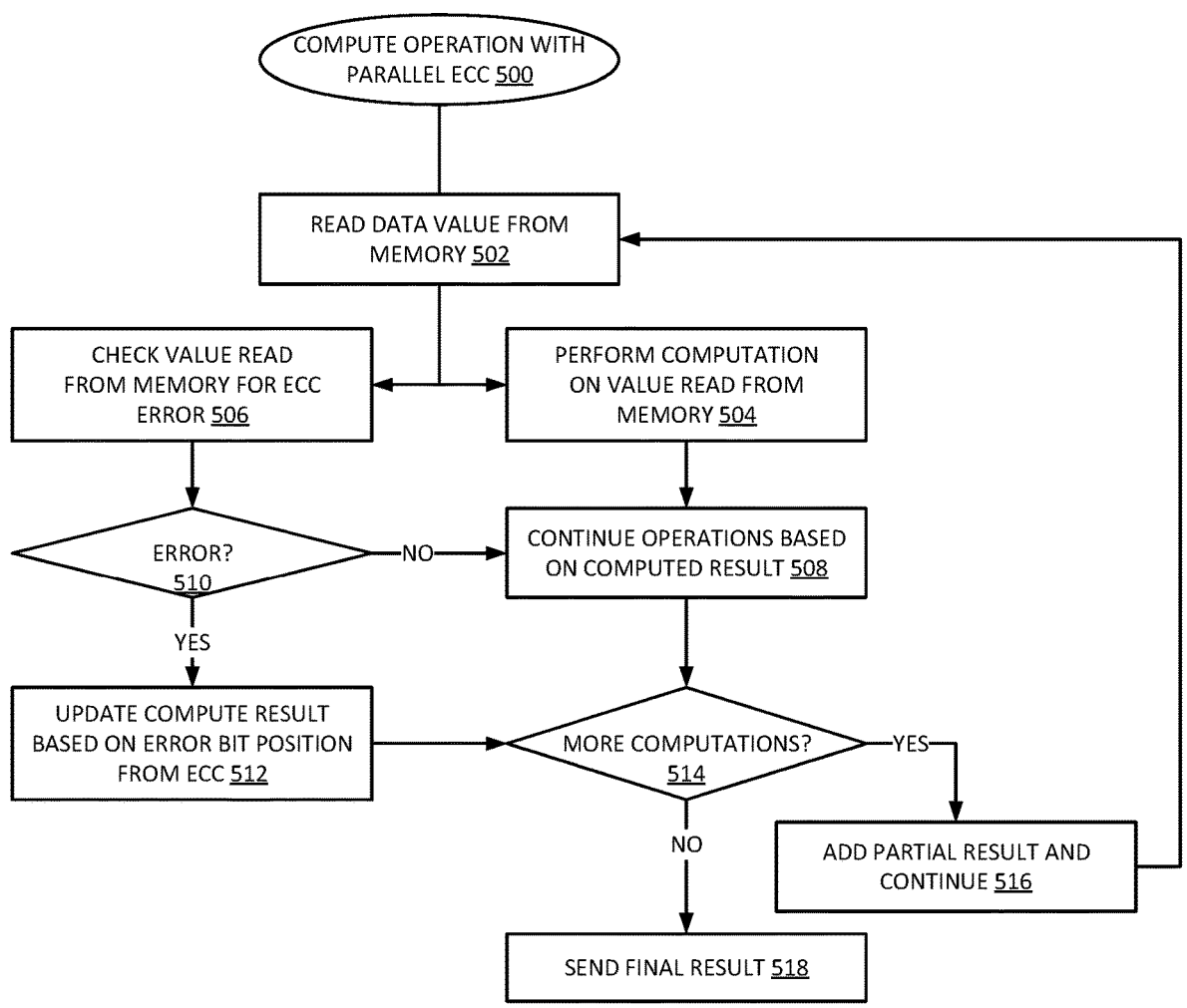
FIG. 5 is a flow diagram of an example of a process for concurrent or parallel operation of compute and ECC for a near memory node.

FIG. 5 is a flow diagram of an example of a process for concurrent or parallel operation of compute and ECC for a near memory node. Process 500 represents a process for a CNM node or compute pipeline in accordance with any description herein.

The compute node reads a value from a memory array, at 502. The compute node performs the computation with compute hardware on the value read from the memory array, at 504. The compute node also checks the value read from memory for ECC errors, at 506. It will be understood that the computation and the checking for ECC errors occurs concurrently.

The common case will be that no error is detected. If no error is detected, at 510 NO branch, in one example, the compute hardware generates its output, and the CNM node provides the output to continue with operations based on the computed results, at 508. In the rare case, the ECC computation will detect an error. If an error is detected, at 510 YES branch, in one example, the compute node updates the compute result based on the error bit position detected by the ECC, at 512.

Whether computation on the original compute result from 508, or on the corrected compute result from 512, the compute node can determine whether there are more computations to execute. If there are more computations to make, at 514 YES branch, the CNM node can add the partial result or send the partial result to another compute node and continue operation, at 516. The operation continues at 502, reading a data value. If there are no more computations to make, at 514 NO branch, the node can send the final result, at 518.

Figure 6:
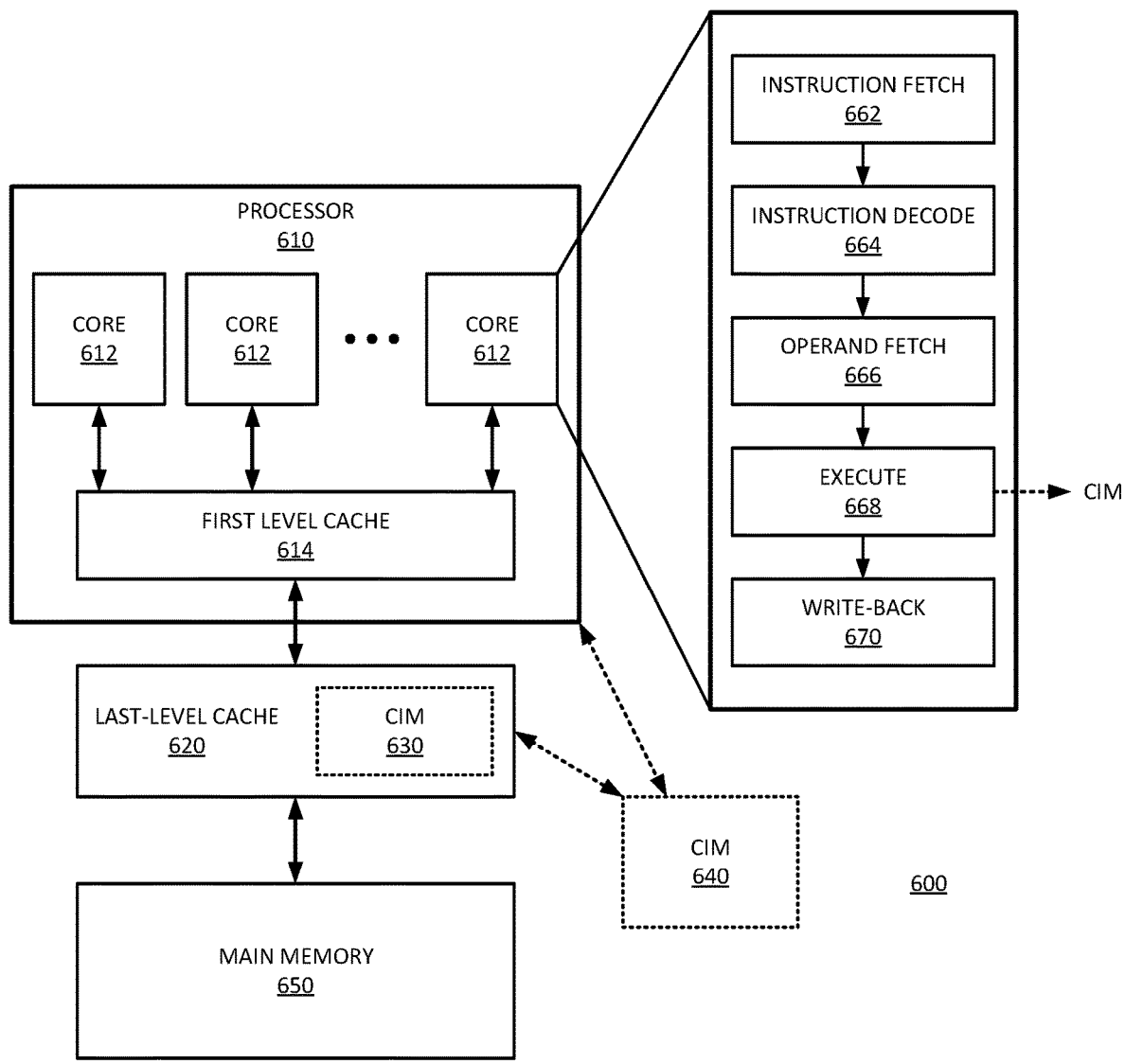
FIG. 6 is a block diagram of an example of a system with a processor and dynamically configurable compute-in/near-memory circuitry.

FIG. 6 is a block diagram of an example of a system with a processor and dynamically configurable compute-in/near-memory circuitry. System 600 can include a CIM circuit with reconfigurable CNM circuitry in accordance with any example described above, such as with system 100, circuit 200, and system 400. The CIM circuit can be a CIM accelerator for machine learning or other compute-intensive operation. An accelerator can be referred to as a coprocessor.

System 600 includes processor 610, which can be or include a general purpose CPU (central processing unit), a GPU (graphics processing unit) such as a multicore GPU, a DSP (digital signal processor) array, or other processor. Processor 610 represents a digital processor and can be referred to as a host processor. In one example, processor 610 includes multiple cores 612. Processor 610 executes applications or software programs that access data for compute-intensive operations.

In one example, processor 610 includes first level cache 614, which represents caching resources within the processor die or processor SOC (system on a chip) that provides physically close storage resources for hot data. In one example, processor 610 includes multiple levels of on-chip/local cache, which are not explicitly shown. It will be understood that cache resources can be local to a specific core 612, shared by multiple cores 612, or a combination of shared cache resources and localized cache resources.

System 600 includes last-level cache 620. In one example, last level cache 620 is also on processor 610. In one example, last level cache 620 is off-chip from processor 610. Last level cache 620 is larger than first level cache 614 but takes longer to access. There may be any number of other cache layers between first level cache 614 and last level cache 620.

Main memory 650 represents system main memory. Main memory 650 is typically orders of magnitude larger than the cache resources, but takes much longer to access relative to the cache resources. Main memory 650 can include volatile memory resources that have indeterminate state when power is interrupted. Main memory 650 can include nonvolatile memory resources that maintain state even when power is interrupted to the memory. Caching resources are typically volatile, but can include nonvolatile memory resources.

System 600 includes a depiction of an instruction execution pipeline for core 612. In one example, each core 612 can include multiple execution pipelines (e.g., multithreading). The instruction pipeline is to be understood as a general explanation, and specific details are not provided. In one example, the instruction pipeline includes instruction fetch 662 where the core fetches the instruction to execute. Instruction decode 664 represents the decoding of the instruction by the core in preparation of the processor circuitry for execution. In one example, instruction decode 664 identifies the instruction as part of a command that triggers use of a CIM circuit for operation.

Operand fetch 666 represents the fetching or obtaining of the operands to be executed on for the instruction. In one example, the operand is a weight vector for a neural network, or other math function operand. In one example, the operands are in or are placed in register space associated with the execution pipeline. Execute 668 represents execution of the instruction on or with the operand(s). In one example, execution can include sending of the operation to CIM circuitry for execution. In one example, the instruction is sent to a processor ALU (arithmetic logic unit), which can trigger the execution by the CIM accelerator. Write-back 670 refers to writing execution results in a results register for return to memory, or for passing to another register for another execution. In the case of use of CIM circuitry, execution 668 and write-back 670 can include sending the operation to CIM circuitry, which will execute the operation and return a functional output, which can then be written back. The execution can include configuration of the CNM circuitry in accordance with any example described herein. Thus, the instruction that would traditionally require loading operands into an ALU or other computation engine within processor 610 can be sent to the CIM circuitry without having to read from memory, and then receiving a computation result from the CIM circuitry instead of from the local computation engine.

CIM 630 represents CIM circuitry implemented in last level cache 620. CIM 630 can be all or part of last level cache 620. In one example, last level cache 620 includes a memory array configured as a CIM circuit, and a memory array that does not include CIM circuitry. The system can selectively store data in the CIM-enabled memory array for CIM acceleration.

CIM 640 represents CIM circuitry that is separate from the cache architecture of system 600. Thus, CIM 640 represents a memory resource that is dedicated to the execution of CIM accelerated operations. Such a CIM memory can still include traditional access hardware to enable reading from the memory without performing a computation.

In one example, invocation of a compute-intensive function triggers directing commands to the CIM accelerator. For example, processor 610 can include support in its instruction set architecture (ISA) for certain commands to trigger operation of a CIM accelerator. In one example, invocation of the CIM accelerator can be preceded by or associated with the loading of configuration information into accelerator. Such configuration information can, for example, define weights of internodal connections, define math functions to be performed, or other configuration. System 600 can load configuration information from system main memory or from nonvolatile mass storage, or a combination.

CIM 630 and CIM 640 include compute nodes or arrays that have compute hardware and ECC hardware that operate in parallel, in accordance with any example provided. Thus, CIM 630 and CIM 640 can provide faster operation by speculatively computing the compute result without waiting for an error detection decision. In the case of an error detection, the output of the compute can be delayed to correct the output based on the error detection performed.

Figure 7:
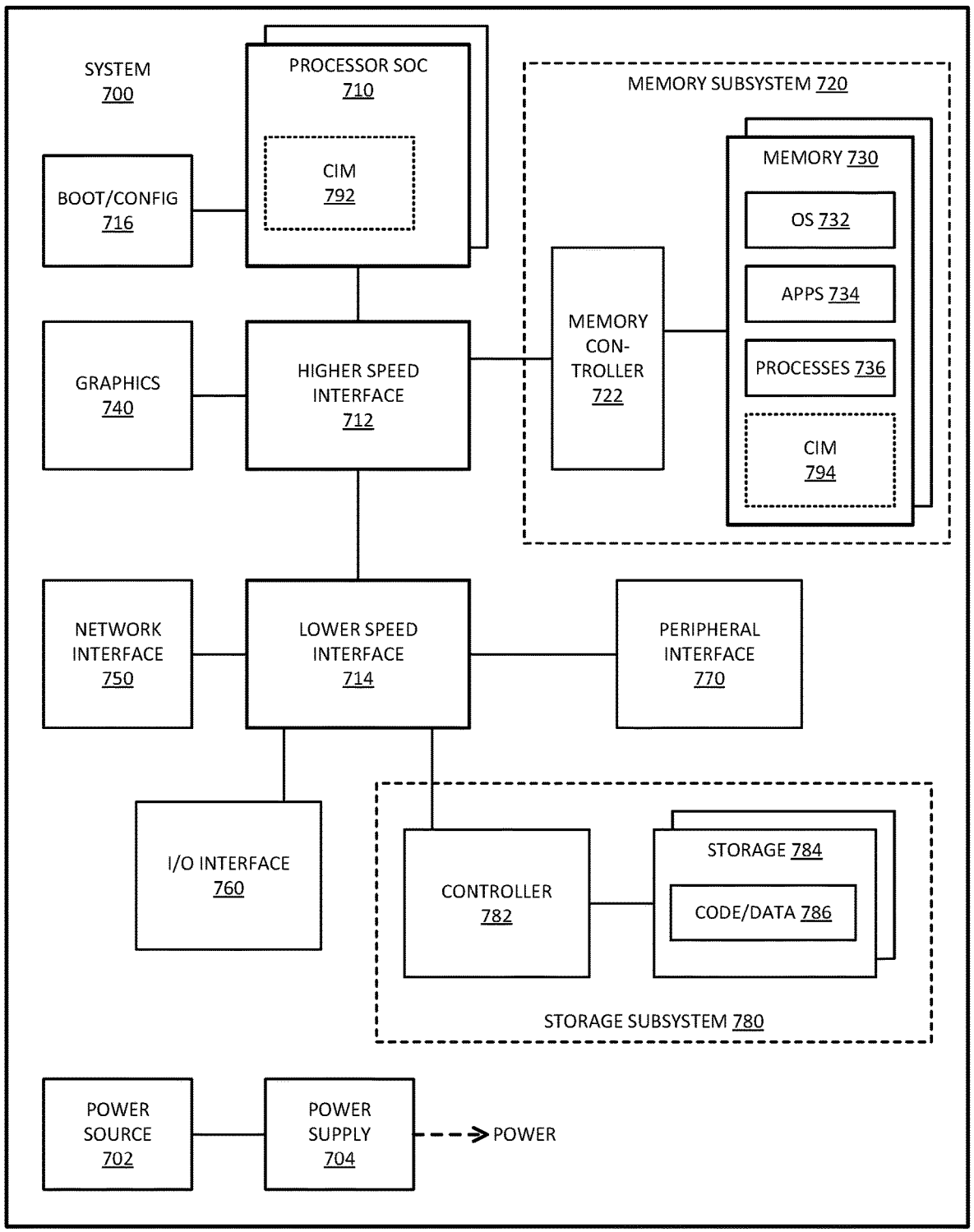
FIG. 7 is a block diagram of an example of a computing system in which compute-in/near-memory (CIM) operations with a dynamically configurable MAC array can be implemented.

FIG. 7 is a block diagram of an example of a computing system in which compute-in-memory (CIM) operations with a dynamically configurable MAC array can be implemented. System 700 represents a computing device in accordance with any example herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

In one example, system 700 includes CIM circuitry. CIM 792 represents an example of CIM circuitry in processor SOC 710. For example, CIM 792 can be a coprocessor circuit or accelerator. CIM 794 represents a CIM circuit in memory subsystem 720. CIM 792 and CIM 794 include compute nodes or arrays that have compute hardware and ECC hardware that operate in parallel, in accordance with any example provided. Thus, CIM 792 and CIM 794 can provide faster operation by speculatively computing the compute result without waiting for an error detection decision. In the case of an error detection, the output of the compute can be delayed to correct the output based on the error detection performed, in accordance with any example herein.

System 700 includes processor SOC 710 (referred to subsequently as "processor 710"), which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 can include a single core or multiple cores. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

System 700 includes boot/config 716, which represents storage to store boot code (e.g., basic input/output system (BIOS)), configuration settings, security hardware (e.g., trusted platform module (TPM)), or other system level hardware that operates outside of a host OS. Boot/config 716 can include a nonvolatile storage device, such as read-only memory (ROM), flash memory, or other memory devices.

In one example, system 700 includes interface 712 coupled to processor 710, which can represent a higher speed interface or a high throughput interface for system components that needs higher bandwidth connections, such as memory subsystem 720 or graphics interface components 740. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more varieties of random-access memory (RAM) such as DRAM, 3DXP (three-dimensional crosspoint), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
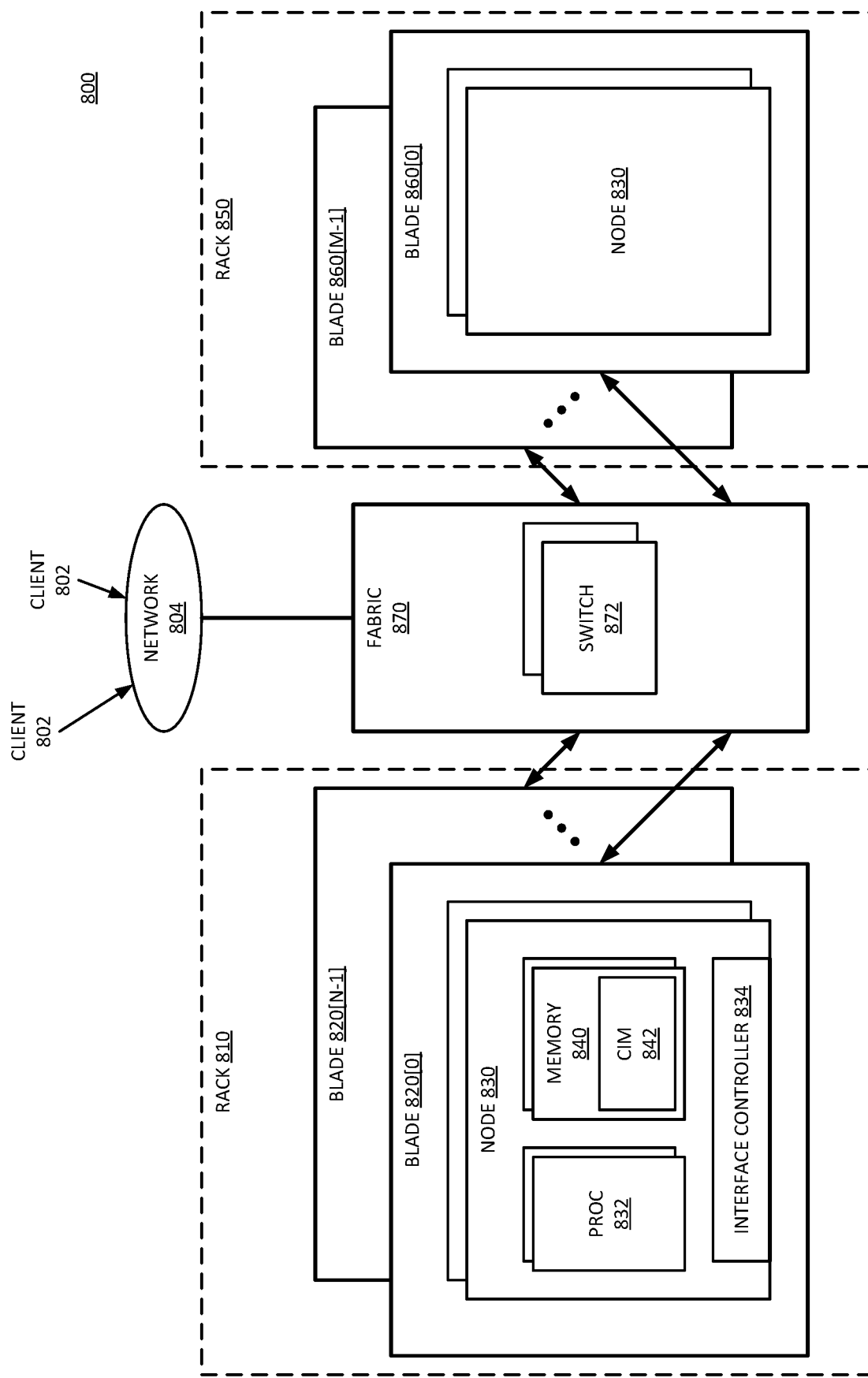
FIG. 8 is a block diagram of an example of a multi-node network in which compute-in/near-memory (CIM) operations with a dynamically configurable MAC array can be implemented.

FIG. 8 is a block diagram of an example of a multi-node network in which compute-in-memory (CIM) operations with a dynamically configurable MAC array can be implemented. System 800 represents a network of nodes in accordance with any example described herein. In one example, system 800 represents a data center. In one example, system 800 represents a server farm. In one example, system 800 represents a data cloud or a processing cloud.

Node 830 includes memory 840. In one example, memory 840 includes CIM circuitry 842. CIM 842 includes compute nodes or arrays that have compute hardware and ECC hardware that operate in parallel, in accordance with any example provided. Thus, CIM 842 can provide faster operation by speculatively computing the compute result without waiting for an error detection decision. In the case of an error detection, the output of the compute can be delayed to correct the output based on the error detection performed, in accordance with any example herein.

One or more clients 802 make requests over network 804 to system 800. Network 804 represents one or more local networks, or wide area networks, or a combination. Clients 802 can be human or machine clients, which generate requests for the execution of operations by system 800. System 800 executes applications or data computation tasks requested by clients 802.

In one example, system 800 includes one or more racks, which represent structural and interconnect resources to house and interconnect multiple computation nodes. In one example, rack 810 includes multiple nodes 830. In one example, rack 810 hosts multiple blade components 820. Hosting refers to providing power, structural or mechanical support, and interconnection. Blades 820 can refer to computing resources on printed circuit boards (PCBs), where a PCB houses the hardware components for one or more nodes 830. In one example, blades 820 do not include a chassis or housing or other "box" other than that provided by rack 810. In one example, blades 820 include housing with exposed connector to connect into rack 810. In one example, system 800 does not include rack 810, and each blade 820 includes a chassis or housing that can stack or otherwise reside in close proximity to other blades and allow interconnection of nodes 830.

System 800 includes fabric 870, which represents one or more interconnectors for nodes 830. In one example, fabric 870 includes multiple switches 872 or routers or other hardware to route signals among nodes 830. Additionally, fabric 870 can couple system 800 to network 804 for access by clients 802. In addition to routing equipment, fabric 870 can be considered to include the cables or ports or other hardware equipment to couple nodes 830 together. In one example, fabric 870 has one or more associated protocols to manage the routing of signals through system 800. In one example, the protocol or protocols is at least partly dependent on the hardware equipment used in system 800.

As illustrated, rack 810 includes N blades 820. In one example, in addition to rack 810, system 800 includes rack 850. As illustrated, rack 850 includes M blades 860. M is not necessarily the same as N; thus, it will be understood that various different hardware equipment components could be used, and coupled together into system 800 over fabric 870. Blades 860 can be the same or similar to blades 820. Nodes 830 can be any type of node and are not necessarily all the same type of node. System 800 is not limited to being homogenous, nor is it limited to not being homogenous.

For simplicity, only the node in blade 820[0] is illustrated in detail. However, other nodes in system 800 can be the same or similar. At least some nodes 830 are computation nodes, with processor (proc) 832 and memory 840. A computation node refers to a node with processing resources (e.g., one or more processors) that executes an operating system and can receive and process one or more tasks. In one example, at least some nodes 830 are server nodes with a server as processing resources represented by processor 832 and memory 840. A storage server refers to a node with more storage resources than a computation node, and rather than having processors for the execution of tasks, a storage server includes processing resources to manage access to the storage nodes within the storage server.

In one example, node 830 includes interface controller 834, which represents logic to control access by node 830 to fabric 870. The logic can include hardware resources to interconnect to the physical interconnection hardware. The logic can include software or firmware logic to manage the interconnection. In one example, interface controller 834 is or includes a host fabric interface, which can be a fabric interface in accordance with any example described herein.

Processor 832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 840 can be or include memory devices and a memory controller.

Reference to memory devices can apply to different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (Double Data Rate version 3, JESD79-3, original release by JEDEC (Joint Electronic Device Engineering Council) in June 2007), DDR4 (DDR version 4, JESD79-4, initial specification published in September 2012 by JEDEC), LPDDR3 (Low Power DDR version 3, JESD209-3, August 2013 by JEDEC), LPDDR4 (LPDDR version 4, JESD209-4, originally published by JEDEC in August 2014), WIO2 (Wide I/O 2 (WideIO2), JESD229-2, originally published by JEDEC in August 2014), HBM (High Bandwidth Memory, JESD235, originally published by JEDEC in October 2013), DDR5 (DDR version 5, currently in discussion by JEDEC), LPDDR5 (LPDDR version 5, JESD209-5, originally published by JEDEC in February 2019), HBM2 (HBM version 2, currently in discussion by JEDEC), or others or combinations of memory technologies, and technologies based on derivatives or extensions of such specifications.

In general with respect to the descriptions herein, in one example an apparatus includes: a memory array to store a data word; an error checking and correction (ECC) circuit to read the data word and perform error detection and error correction on the data word; and a compute circuit to read the data word and perform a computation on the data word to generate an output value; wherein the compute circuit is to generate the output value without waiting for error detection and error correction on the data word by the ECC circuit; wherein in response to error detection in the data word by the ECC circuit, the output value is delayed until correction of the output value in accordance with the error detection by the ECC circuit.

In one example of the apparatus, the ECC circuit comprises an error detection circuit and an error correction circuit separate from the error detection circuit. In accordance with any preceding example of the apparatus, in one example, the compute circuit comprises a first compute circuit to generate a first output value, and further comprising a second compute circuit to generate a second output value; wherein the first compute circuit has a first error detection circuit and the second compute circuit has a second error detection circuit, wherein the first compute circuit and the second compute circuit share the error correction circuit. In accordance with any preceding example of the apparatus, in one example, the memory array comprise a first memory array to store a first data word, the first compute circuit to generate the first output value from the first data word, and further comprising a second memory array to store a second data word, the second compute circuit to generate the second output value from the second data word. In accordance with any preceding example of the apparatus, in one example, the ECC circuit is to correct the output value. In accordance with any preceding example of the apparatus, in one example, the apparatus includes a data path with circuitry to correct the output value. In accordance with any preceding example of the apparatus, in one example, the ECC circuit is to perform error detection on the data word in one operation cycle, and wherein the compute circuit is to perform the computation on the data word in one operation cycle. In accordance with any preceding example of the apparatus, in one example, the compute circuit comprises a compute near memory (CNM) circuit. In accordance with any preceding example of the apparatus, in one example, the CNM circuit comprises a multiply-accumulate (MAC) circuit. In accordance with any preceding example of the apparatus, in one example, the memory array comprises an array of static random access memory (SRAM) cells. In accordance with any preceding example of the apparatus, in one example, the memory array comprises an array of dynamic random access memory (DRAM) cells. In accordance with any preceding example of the apparatus, in one example, the memory array comprises an array of resistive-based random access memory (RAM) cells.

In general with respect to the descriptions herein, in one example a computing device includes: a host processor; and an accelerator circuit including a memory array to store a data word; an error checking and correction (ECC) circuit to read the data word and perform error detection and error correction on the data word; and a compute circuit to read the data word and perform a computation on the data word to generate an output value; wherein the compute circuit is to generate the output value without waiting for error detection and error correction on the data word by the ECC circuit; wherein in response to error detection in the data word by the ECC circuit, outputting of the output value is delayed until correction of the output value in accordance with the error detection by the ECC circuit.

In one example of the computing device, the ECC circuit comprises an error detection circuit and an error correction circuit separate from the error detection circuit. In accordance with any preceding example of the computing device, in one example, the compute circuit comprises a first compute circuit to generate a first output value, and further comprising a second compute circuit to generate a second output value; wherein the first compute circuit has a first error detection circuit and the second compute circuit has a second error detection circuit, wherein the first compute circuit and the second compute circuit share the error correction circuit. In accordance with any preceding example of the computing device, in one example, the memory array comprise a first memory array to store a first data word, the first compute circuit to generate the first output value from the first data word, and further comprising a second memory array to store a second data word, the second compute circuit to generate the second output value from the second data word. In accordance with any preceding example of the computing device, in one example, the ECC circuit is to correct the output value. In accordance with any preceding example of the computing device, in one example, the computing device includes a data path with circuitry to correct the output value. In accordance with any preceding example of the computing device, in one example, the ECC circuit is to perform error detection on the data word in one operation cycle, and wherein the compute circuit is to perform the computation on the data word in one operation cycle. In accordance with any preceding example of the computing device, in one example, the compute circuit comprises a compute near memory (CNM) circuit. In accordance with any preceding example of the computing device, in one example, the CNM circuit comprises a multiply-accumulate (MAC) circuit. In accordance with any preceding example of the computing device, in one example, the memory array comprises an array of static random access memory (SRAM) cells. In accordance with any preceding example of the computing device, in one example, the memory array comprises an array of dynamic random access memory (DRAM) cells. In accordance with any preceding example of the computing device, in one example, the memory array comprises an array of resistive-based random access memory (RAM) cells. In accordance with any preceding example of the computing device, in one example, the host processor comprises a multicore central processing unit (CPU). In accordance with any preceding example of the computing device, in one example, the host processor comprises a multicore graphics processing unit (GPU). In accordance with any preceding example of the computing device, in one example, the computing device includes one or more of: a display communicatively coupled to the host processor; a network interface communicatively coupled to the host processor; or a battery to power the computing device.

In general with respect to the descriptions herein, in one example a method includes: reading a data word with an error checking and correction (ECC) circuit and performing error detection and error correction on the data word; and reading the data word with a compute circuit and performing a computation on the data word to generate an output value, without waiting for error detection and error correction on the data word by the ECC circuit; wherein in response to error detection in the data word by the ECC circuit, delaying outputting the output value until correction of the output value in accordance with the error detection by the ECC circuit.

In one example of the method, the ECC circuit comprises an error detection circuit and an error correction circuit separate from the error detection circuit. In accordance with any preceding example of the method, in one example, the compute circuit comprises a first compute circuit to generate a first output value, and further comprising a second compute circuit to generate a second output value; wherein the first compute circuit has a first error detection circuit and the second compute circuit has a second error detection circuit, wherein the first compute circuit and the second compute circuit share the error correction circuit. In accordance with any preceding example of the method, in one example, the memory array comprise a first memory array to store a first data word, the first compute circuit to generate the first output value from the first data word, and further comprising a second memory array to store a second data word, the second compute circuit to generate the second output value from the second data word. In accordance with any preceding example of the method, in one example, the ECC circuit is to correct the output value. In accordance with any preceding example of the method, in one example, correction of the output value comprises correcting the output value with a data path separate from the ECC circuit. In accordance with any preceding example of the method, in one example, the ECC circuit is to perform error detection on the data word in one operation cycle, and wherein the compute circuit is to perform the computation on the data word in one operation cycle. In accordance with any preceding example of the method, in one example, the compute circuit comprises a compute near memory (CNM) circuit. In accordance with any preceding example of the method, in one example, the CNM circuit comprises a multiply-accumulate (MAC) circuit. In accordance with any preceding example of the method, in one example, reading the data word comprises reading an array of static random access memory (SRAM) cells. In accordance with any preceding example of the method, in one example, reading the data word comprises reading an array of dynamic random access memory (DRAM) cells. In accordance with any preceding example of the method, in one example, reading the data word comprises reading an array of resistive-based random access memory (RAM) cells.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   a memory array to store a data word;
   an error checking and correction (ECC) circuit to read the data word and perform error detection on the data word and generate an error signal capable to indicate whether an error was detected in the data word; and
   a compute circuit to read the data word and begin a computation on the data word prior to generation of the error signal, wherein the computation is to generate an output value;
   wherein in response to the error detection in the data word indicated by the error signal generated by the ECC circuit, the output value is delayed until correction of the output value in accordance with the error detection by the ECC circuit.

2. The apparatus of claim 1, wherein the ECC circuit comprises an error detection circuit and an error correction circuit separate from the error detection circuit.

3. The apparatus of claim 2, wherein the compute circuit comprises a first compute circuit to generate a first output value, and further comprising a second compute circuit to generate a second output value;
   wherein the first compute circuit has a first error detection circuit and the second compute circuit has a second error detection circuit, wherein the first compute circuit and the second compute circuit share the error correction circuit.

4. The apparatus of claim 3, wherein the memory array comprise a first memory array to store a first data word, the first compute circuit to generate the first output value from the first data word, and further comprising a second memory array to store a second data word, the second compute circuit to generate the second output value from the second data word.

5. The apparatus of claim 1, wherein the ECC circuit is to correct the output value.

6. The apparatus of claim 1, further comprising a data path with circuitry to correct the output value.

7. The apparatus of claim 1, wherein the ECC circuit is to perform the error detection on the data word in one operation cycle, and wherein the compute circuit is to perform the computation on the data word in one operation cycle.

8. The apparatus of claim 1, wherein the compute circuit comprises a compute near memory (CNM) circuit.

9. The apparatus of claim 8, wherein the CNM circuit comprises a multiply-accumulate (MAC) circuit.

10. The apparatus of claim 1, wherein the memory array comprises an array of static random access memory (SRAM) cells.

11. The apparatus of claim 1, wherein the memory array comprises an array of dynamic random access memory (DRAM) cells.

12. The apparatus of claim 1, wherein the memory array comprises an array of resistive-based random access memory (RAM) cells.

13. A computing device, comprising:
    a host processor; and
    an accelerator circuit including
       a memory array to store a data word;
       an error checking and correction (ECC) circuit to read the data word and perform error detection on the data word and generate an error signal capable to indicate whether an error was detected in the data word; and
       a compute circuit to read the data word and begin a computation on the data word prior to generation of the error signal, wherein the computation is to generate an output value;
       wherein in response to the error detection in the data word indicated by the error signal generated by the ECC circuit, outputting of the output value is delayed until correction of the output value in accordance with the error detection by the ECC circuit.

14. The computing device of claim 13, wherein the ECC circuit comprises an error detection circuit and an error correction circuit separate from the error detection circuit.

15. The computing device of claim 14, wherein the compute circuit comprises a first compute circuit to generate a first output value, and further comprising a second compute circuit to generate a second output value;
    wherein the first compute circuit has a first error detection circuit and the second compute circuit has a second error detection circuit, wherein the first compute circuit and the second compute circuit share the error correction circuit.

16. The computing device of claim 15, wherein the memory array comprise a first memory array to store a first data word, the first compute circuit to generate the first output value from the first data word, and further comprising a second memory array to store a second data word, the second compute circuit to generate the second output value from the second data word.

17. The computing device of claim 13, wherein the ECC circuit is to correct the output value.

18. The computing device of claim 13, the accelerator circuit further including a data path with circuitry to correct the output value.

19. The computing device of claim 13, wherein the compute circuit comprises a compute near memory (CNM) circuit.

20. The computing device of claim 13, wherein the host processor comprises a multicore central processing unit (CPU) or a multicore graphics processing unit (GPU).

21. The computing device of claim 20, further comprising:
    a display communicatively coupled to the host processor;
    a network interface communicatively coupled to the host processor; or
    a battery to power the computing device.

* * * * *